(12) United States Patent
Dempsey

(10) Patent No.: US 10,499,617 B1
(45) Date of Patent: Dec. 10, 2019

(54) BUCKLE

(71) Applicant: Donald Brian Dempsey, Greensboro, NC (US)

(72) Inventor: Donald Brian Dempsey, Greensboro, NC (US)

(73) Assignee: Yellow Dog Design, Inc., Greensboro, NC (US)

( * ) Notice: Subject to any disclaimer, the term of this patent is extended or adjusted under 35 U.S.C. 154(b) by 34 days.

(21) Appl. No.: 15/915,337

(22) Filed: Mar. 8, 2018

Related U.S. Application Data

(60) Provisional application No. 62/488,436, filed on Apr. 21, 2017.

(51) Int. Cl.
*A44B 11/25* (2006.01)
*A01K 27/00* (2006.01)

(52) U.S. Cl.
CPC .......... *A01K 27/006* (2013.01); *A01K 27/005* (2013.01); *A44B 11/25* (2013.01)

(58) Field of Classification Search
CPC .... A01K 27/00; A01K 27/001; A01K 27/002; A01K 27/005; A44B 11/266; A44B 11/05; A44B 11/25; A44B 11/005; A44B 11/2515; A44B 11/2519; A44B 11/2549; Y10T 24/4745

USPC .......................................................... 24/307
See application file for complete search history.

(56) References Cited

U.S. PATENT DOCUMENTS

| | | | |
|---|---|---|---|
| 7,596,837 B1 * | 10/2009 | Tucker ............... | A44B 11/2549 24/630 |
| D761,495 S | 7/2016 | Rose-Grant | |
| 2015/0054272 A1 * | 2/2015 | Longenecker ....... | B60N 2/2812 280/808 |

* cited by examiner

*Primary Examiner* — Jack W Lavinder
(74) *Attorney, Agent, or Firm* — Tuggle Duggins P.A.; Blake P. Hurt

(57) ABSTRACT

A buckle having a male buckle member and a female buckle member adapted for mating latching engagement with one another, and a removable integrated attachment member adapted to engage with the male buckle member and fits between the male buckle member and the female buckle member when the two are in latched engagement and can be readily and easily removed from the male buckle member. The removable integrated attachment member has a projection that sits above the surface of the buckle members to facilitate attachment of a split-ring, carabiner, s-clip or other device for use in attaching items to the removable integrated attachment member. The buckle is particularly suited for use on an animal restraint, such as a collar or harness, but can also be employed on other articles having buckles anywhere an attachment point is desired.

16 Claims, 7 Drawing Sheets

BUCKLE

CROSS-REFERENCE TO RELATED APPLICATIONS

This non-provisional patent application claims all benefits under 35 U.S.C. § 119(e) of U.S. provisional patent application Ser. No. 62/488,438 filed 21 Apr. 2017, entitled "COLLAR TRANSFER CLIP" in the United States Patent and Trademark Office, which is incorporated by reference in its entirety herein.

FIELD OF THE INVENTION

The invention herein pertains to a buckle, and more particularly pertains to a buckle having a removable, integrated attachment member and is especially useful as a component to a collar or harness for an animal.

DESCRIPTION OF THE PRIOR ART AND OBJECTIVES OF THE INVENTION

According to the Insurance Information Institute, over 85 million households own at least one dog or cat, representing roughly 60% of all households in the United States. It is customary for dogs, cats and other pets to wear a collar or harness. The collar fits around the neck of the animal and typically is a strap of webbing with a buckle, clasp or other fastener used to secure the opposite ends of the webbing together. A harness is a little more complicated and fits about the chest, shoulders and/or front legs of the animal.

The animal collar and/or harness can serve several purposes. For example, the collar or harness provides a convenient location to affix various hangtags that provide information about the animal or the owner, such as a rabies vaccination tag, animal license, animal identification tag, owner information tag, etc. The collar or harness is also a point of attachment for a leash for purposes of controlling the movement or behavior of the animal.

It is common today for pet owners to have multiple collars and/or harnesses. For example, a pet owner may use a collar for the identification tag but prefers a harness when walking the animal outdoors. Many pet owners also desire to use the collar or harness as a fashion accessory for the pet, and may have multiple collars or harnesses with different colors or designs. Specialty harnesses may be employed such as for training the animal not to jump or use of a combination harness and muzzle bay for animals prone to biting.

To facilitate attachment of the identification tags and leash to the collar or harness, a metal or plastic ring or loop is typically sewn into the webbing of the collar/harness, most often near the buckle or clasp. This can and is problematic in several situations. For example, multiple tags on the collar ring can interfere with the ability to attach or detach the leash securely, easily and quickly. In addition, switching the identification tags and leash from one collar/harness to another can be time consuming and tedious, and often requires the use of hand tools such as pliers or the like. The problem is compounded for households having more than one pet.

There is need for a device that permits simple, easy and convenient transfer of a leash and/or animal identification tags from one collar to another, or from a collar to a harness, or from one harness to another.

Thus, in view of the problems and disadvantages associated with prior art devices, the present invention was conceived and one of its objectives is to provide a simple, easy and convenient buckle for use on an animal collar of harness.

It is another objective of the present invention to provide a buckle particularly suited for use on an animal collar or harness that includes a male buckle member, a female buckle member, and a removable integrated attachment member.

Various other objectives and advantages of the present invention will become apparent to those skilled in the art as a more detailed description is set forth below.

SUMMARY OF THE INVENTION

The aforesaid and other objectives are realized by providing a buckle for an animal collar, the buckle having a male buckle member, a female buckle member, and a removable integrated attachment member. The male buckle member and female buckle member are adapted for matching latching engagement with one another. The removable integrated attachment member is adapted to engage with the male buckle member and fits between the male buckle member and the female buckle member when the two are in latched engagement. The removable integrated attachment member has a projection that sits above the buckle members to facilitate the attachment of a split-ring, s-clip, carabiner or other device for use in attaching animal tags or the leash to the removable integrated attachment member. The removable integrated attachment member can be readily and easily removed from the male buckle member and transferred to another collar, harness of other device, thus facilitating use of multiple collars or harnesses for a single animal quickly, simply and conveniently.

DETAILED DESCRIPTION OF THE PREFERRED EMBODIMENT AND OPERATION OF THE INVENTION

Figure 1:
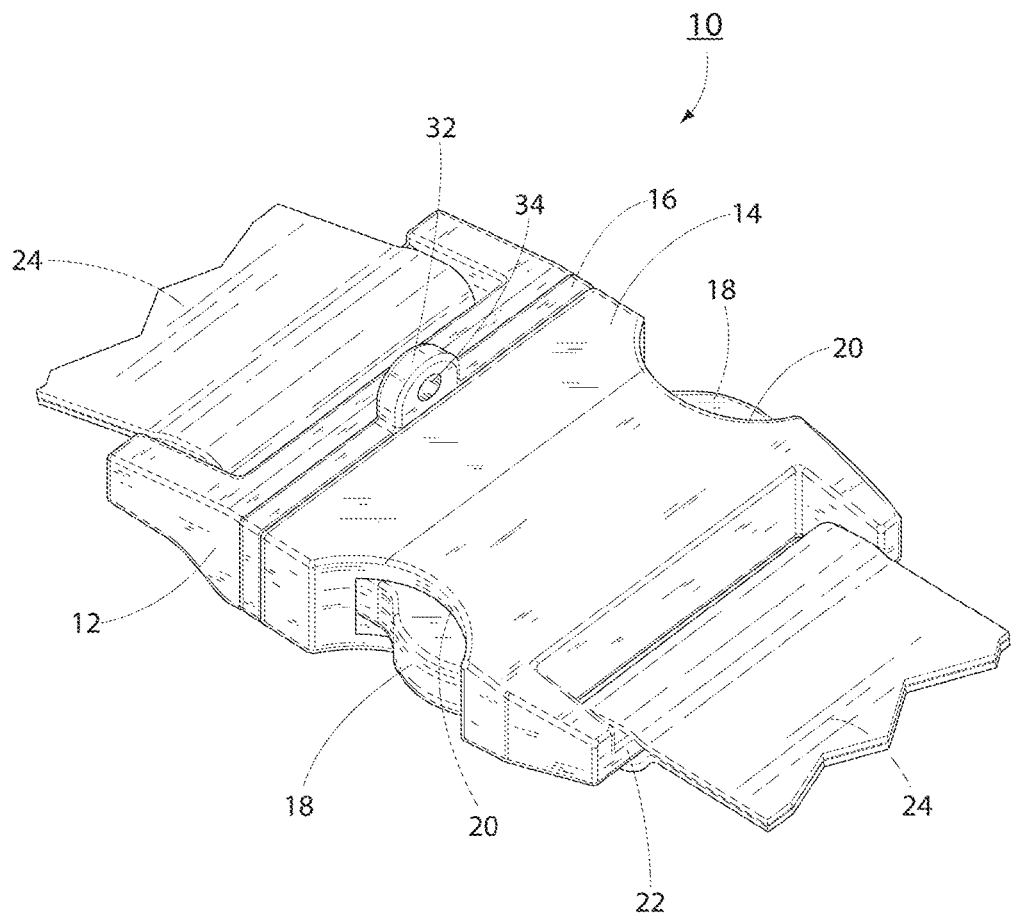
FIG. 1 is a perspective view of a buckle according to one embodiment.
Figure 2:
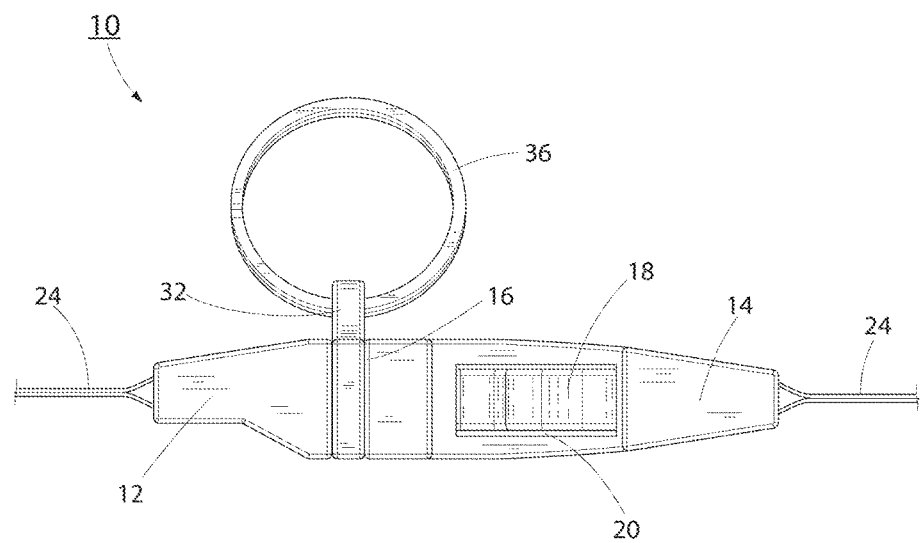
FIG. 2 is side elevational view of the buckle of FIG. 1.
Figure 3:
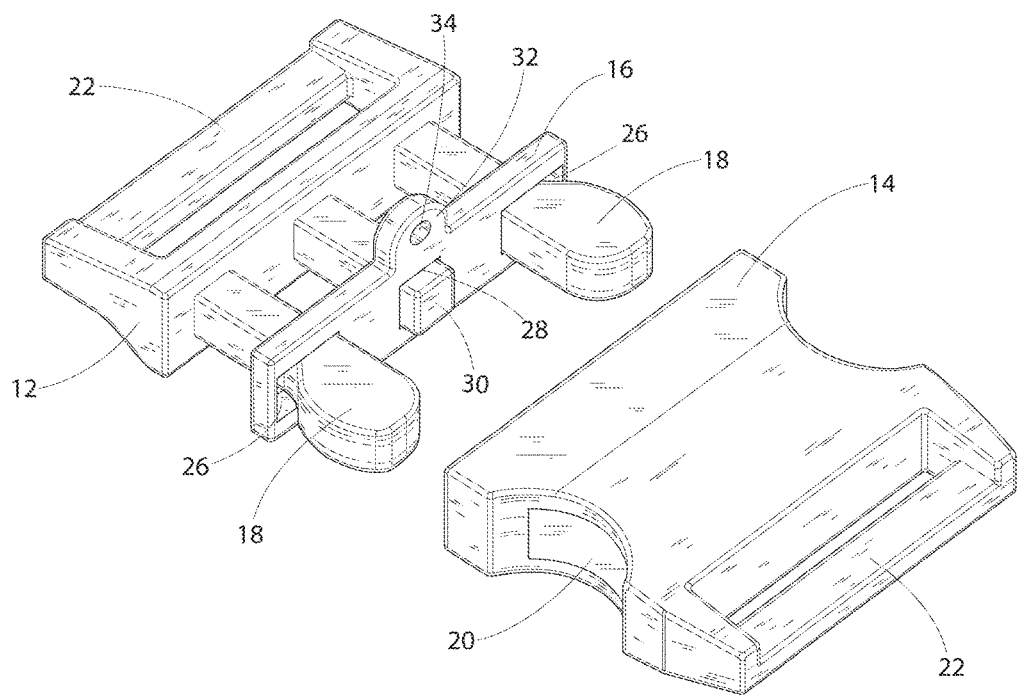
FIG. 3 is an exploded perspective view of the buckle of FIG. 1, shown in an open condition.

With reference made to FIGS. 1-3, the buckle is indicated by numeral 10, and comprises three basic components: a male buckle member 12, a female buckle member 14 and a removable integrated attachment member 16 defining an attachment. The male buckle member 12 and female buckle member 14 are adapted for mating engagement with one another, as is known in the art. Male buckle member 12 has a pair of spaced-apart, parallel resilient legs 18 (see FIG. 3) that are adapted for mating engagement with corresponding recesses 20 in the female buckle member 14. As the male buckle member 12 and female buckle member 14 are brought together, the spring legs 18 flex toward one another (i.e. towards a midline) and then, when they reach the recesses 20, "spring" outwardly (i.e. away from a midline) to engage the female buckle member 14 and the male buckle member 12 together. Compressing the spring legs 18 toward one another will permit the male buckle member 12 and the female buckle member 14 to be separated from one another.

Each of the male buckle member 12 and the female buckle member 14 has a strap attachment bar 22 (see FIG. 3) which enables a web or strap 24 to be attached to the male and female buckle members, respectively. The web or strap 24 may be attached by looping the web or strap 24 around the bar 22 and then securing the strap 24 in any known manner, such as by sewing, snaps, rivets, adhesive, hook-and-look type fasteners, etc. Although not shown in the Figures, the web or strap 24 may be provided with an adjustment feature to permit adjustment of the length of the strap 24 to accommodate different animals. The adjustment feature may be of any type known and used in the art.

The removable integrated attachment member 16, as seen in FIGS. 1-3, fits between the male buckle member 12 and the female buckle member 14, whereby the removable integrated attachment member 16 is held in position then the buckle 10 is fastened together. In the embodiment shown in FIGS. 1-3, the integrated attachment member 16 is a bar shaped member having spaced-apart apertures or openings 26 positioned to fit over the spring legs 18 of male buckle member 12, and a central aperture or opening 28 positioned to fit over alignment leg 30 on the male buckle member 12. The openings 26 and 28 preferably provide three points of attachment as defined by the integrated attachment member 16 and thus prevent unwanted rotation or movement of integrated attachment member 16 relative to the buckle 10. The openings 26 and 28 are large enough to allow the integrated attachment member 16 to slide on and off the male buckle member 12 with ease, but also provide a secure fit when the buckle is in a latched condition.

In the embodiment shown in FIGS. 1-3, the removable integrated attachment member 16 has a central projection 32, which is provided with an aperture 34. The projection 32 and aperture 34 are sized to extend beyond the surface of the male buckle member 12 so as to be accessible when the buckle is in a latched condition, as best seen in FIGS. 1 and 2. The projection 32 and aperture 34 thus provide a convenient location for attachment of a split ring 36 (see FIG. 2) for attachment of animal identification tags or a leash. Alternatives to the split ring, for example a carabiner, s-clip, snap ring or other suitable device may be used to advantage as desired.

Figure 4:
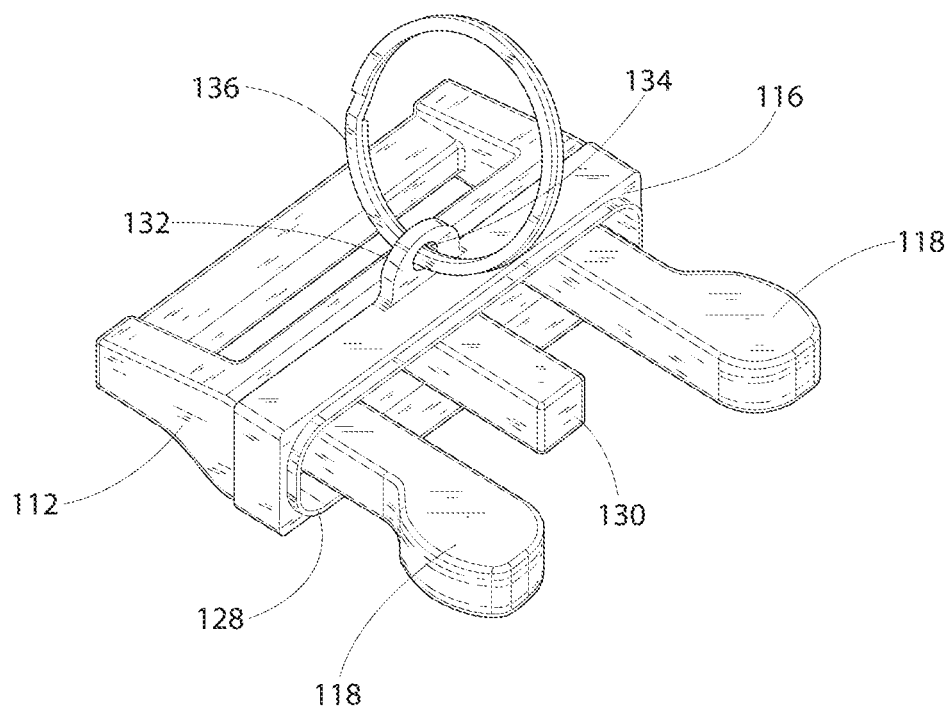
FIG. 4 is a perspective view of a male component of the buckle, showing an alternate embodiment of the removable integrated attachment member.

With reference now made to FIGS. 4-7, alternate embodiments of the removable integrated attachment member are illustrated therein. In FIG. 4, the removable integrated attachment member 116 is shown in position relative to male buckle member 112. In this embodiment, the removable integrated attachment member 116 has a rectangular frame that engages the outer surface of the male buckle member 112. The removable integrated attachment member 116 may be sized to engage the male buckle member 112 in a friction fit, but this is not strictly necessary, as the removable integrated attachment member 116 will be interdisposed between the male and female components of the buckle once they are in latched condition as in the prior embodiment. An elongated slot 128 is large enough to accommodate the spring legs 118, 118 and the alignment leg 130.

As in the prior embodiment shown in FIGS. 1-3, the removable integrated attachment member 116 has a protrusion 132 that sits above the surface of the buckle member 112. The protrusion 132 has an aperture 134 to facilitate attachment of a split ring 136 to the removable integrated attachment member 116.

Figure 5:
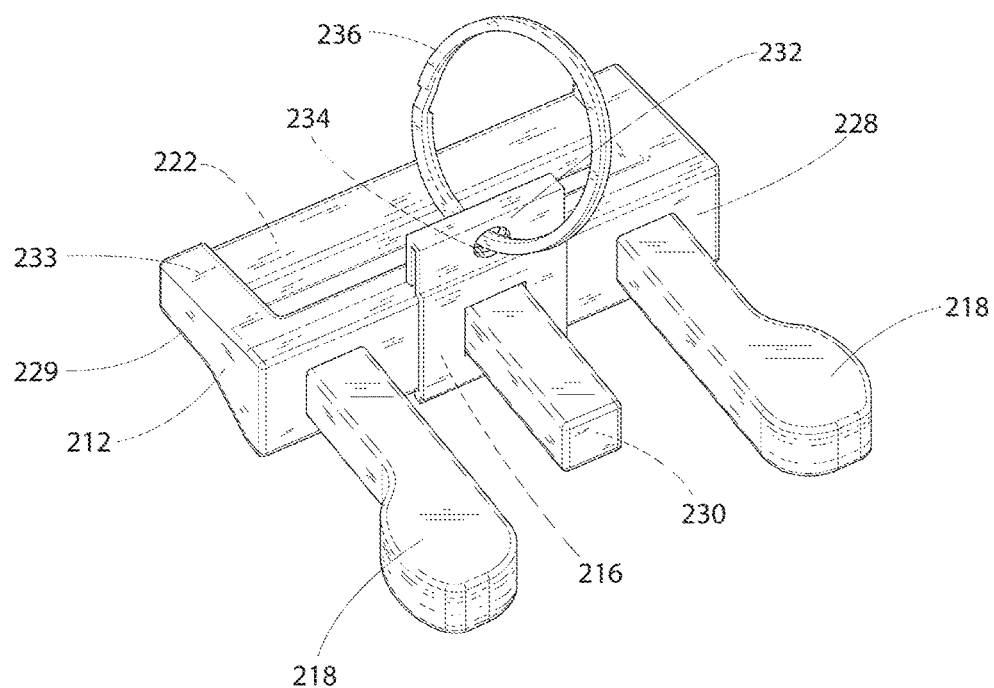
FIG. 5 is a perspective view of a male component of the buckle, showing an alternate embodiment of the removable integrated attachment member.
Figure 6:
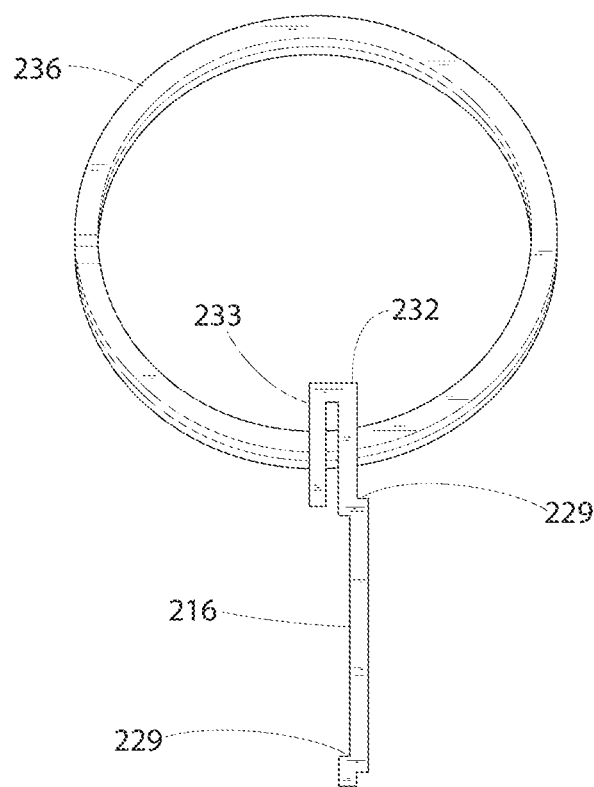
FIG. 6 is a side elevational view of the embodiment for the integrated attachment member shown in FIG. 5.

FIGS. 5-6 show another embodiment of the removable integrated attachment member. In this embodiment, the removable integrated attachment member 216 has a plate-like configuration with an aperture 228 that is of suitable size and position to allow the removable integrated attachment member to fit over the central alignment leg 230 of the male buckle member 212. A vertical extension of the removable integrated attachment member 216 forms the protrusion 232, which has an aperture 234 to facilitate attachment of a split ring 236 to the removable integrated attachment member 216.

In all embodiments, skilled artisans will understand that the removable integrated attachment member needs to be sufficiently thin so as not to interfere with the ability to latch and unlatch the male and female buckle members. Specifically, the width of the attachment member embodiments is preferably less than the longitudinally length of the portion of leg 18 necessary to frictionally engage with female buckle member 14. With this in mind, the removable integrated attachment member 216 has upper and lower shoulders 229, 229 (FIG. 6) to off-set the protrusion 232. While not strictly necessary, the off-set feature might be used to improve the latching engagement between the male buckle member 212 and to corresponding female buckle member (not shown). As seen in FIGS. 5 and 6, the upper and lower shoulders 229 are spaced from one another and will preferably correspond to the lateral width of the male buckle member 212 to provide additional engagement between the removable integrated attachment member 216 and the male buckle member 212. The shoulders 229 also might be useful to provide rigidity to the relatively thin removable integrated attachment member 216. For the same reasons, the protrusion 232 is shown with a tab 233, which effectively doubles the thickness of the protrusion to provide added strength and rigidity.

Figure 7:
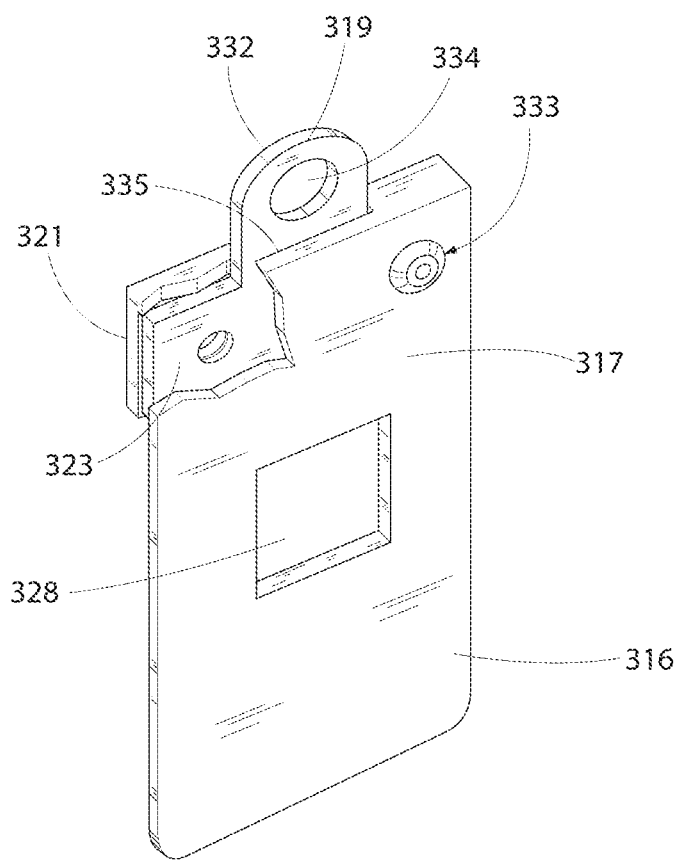
FIG. 7 is a perspective view, partially fragmented, of an alternate embodiment of the removable integrated attachment member.

With reference to FIG. 7, the embodiment of removable integrated attachment member 316 illustrated therein is a two-piece construction and has a body portion 317 and a tab member 319. The body portion 317 has a generally flat planar configuration with a fold-over portion 321 at the upper end. The tab member 319 has a flat shoulder portion 323 and a tab protrusion 332. The shoulder portion 323 of tab member 319 is located within the fold-over portion 321 of the body portion 317 and affixed thereto by any suitable means, such as by rivets 333. The protrusion 332 is disposed through a slot or aperture 335 in the fold-over portion and extends therefrom.

As in prior embodiments, an aperture 334 is provided in the protrusion 332 to facilitate attachment of a split ring (not shown). Similarly, the body portion 317 is provided with an aperture 328 of size and position to permit attachment of the removable integrated attachment member 316 to a central alignment leg on the male buckle member (see members 30, 130, or 230 in FIGS. 3-5).

In the various embodiments, the buckle members may be made of a durable plastic, metal or composite material, as is known in the art. The removable integrated attachment, depending on the embodiment, may be constructed of plastic, metal, composite, or durable, tear-resistant fabric or webbing, the latter being particularly applicable to the embodiment shown in FIG. 7.

While embodiments of the instant buckle have been described as particularly useful in connection with an animal collar or harness, the buckle has other practical uses. For example, when used on a backpack, waist pack, briefcase, purse or piece of luggage, the removable integrated attachment member provides a convenient location for attachment of a key ring, water bottle, identification tag, flashlight, compass or any other item. Similarly, when used on a tent or tarp, the removable integrated attachment member provides an attachment point for cordage for a tie down or guy line.

The illustrations and examples provided herein are for explanatory purposes and are not intended to limit the scope of the appended claims.

I claim:

1. A buckle comprising a male buckle member further comprising a pair of spaced-apart spring legs and an alignment leg; a female buckle member structured for mating latching relationship with the male buckle member; and a removable integrated attachment member, the integrated attachment member further comprising a plate having apertures spaced to receive the spring legs and the alignment leg, the removable integrated attachment member adapted to be positioned and held between the male buckle member and the female buckle member when in latched engagement.

2. The buckle of claim 1, wherein the removable integrated attachment member further comprises a raised projection having an aperture to facilitate attachment of a split ring or clip.

3. The buckle of claim 2, wherein the plate member defines a shoulder and wherein the raised projection is off-set relative the plate member.

4. The buckle of claim 3, wherein the male buckle member and the female buckle member are affixed to webbing or strapping.

5. The buckle of claim 4, wherein the webbing or strapping forms a component of an animal restraining device selected from a collar and a harness.

6. The buckle of claim 1, wherein the male buckle member and the female buckle member are affixed to webbing or strapping.

7. The buckle of claim 6, wherein the webbing or strapping forms a component of an animal restraining device selected from a collar and a harness.

8. The buckle of claim 1, wherein the removable integrated attachment member comprises a hollow rectangular frame sized to engage an outer periphery of the male buckle member, said frame having a central opening sized to accommodate the spring legs and the alignment leg.

9. The buckle of claim 8, wherein the removable integrated attachment member further comprises a raised projection having an aperture to facilitate attachment of a split ring or clip.

10. The buckle of claim 9, wherein the male buckle member and the female buckle member are affixed to webbing or strapping.

11. The buckle of claim 10, wherein the webbing or strapping forms a component of an animal restraining device selected from a collar and a harness.

12. The buckle of claim 1, wherein the removable integrated attachment member comprises a body portion and a tab member; wherein the body portion has a generally flat, planar configuration with a fold-over area at an upper end and an aperture positioned and sized to receive the alignment leg of the male buckle member; wherein the tab member has a flat shoulder portion and a tab protrusion, wherein the shoulder portion of the tab member is located within the fold-over area of the body portion and affixed thereto; said tab protrusion is disposed through a slot in the fold-over area and extends therefrom, said tab protrusion having an aperture to facilitate attachment of a split ring or clip.

13. The buckle of claim 12, wherein the male buckle member and the female buckle member are affixed to webbing or strapping.

14. The buckle of claim 13, wherein the webbing or strapping forms a component of an animal restraining device selected from a collar and a harness.

15. The buckle of claim 1, wherein the male buckle member further comprises a strap bar.

16. The buckle of claim 1, wherein the female buckle member further comprises a strap bar.

* * * * *